July 7, 1959 — H. A. PELLER — 2,893,470
ADJUSTABLE SEAT
Filed Oct. 7, 1957

INVENTOR.
Henry A. Peller
BY R. F. Barnard
ATTORNEY

United States Patent Office 2,893,470
Patented July 7, 1959

2,893,470
ADJUSTABLE SEAT

Henry A. Peller, Cleveland, Ohio, assignor to General Motors Corporation, Detroit, Mich., a corporation of Delaware Application October 7, 1957, Serial No. 688,648

17 Claims. (Cl. 155—9)

The present invention relates to a vertically adjustable seat and, more particularly, to a seat of relatively simple yet durable construction for use particularly on heavy duty off-the-road earth moving vehicles.

It is desirable to provide a vertically adjustable seat, particularly for use with heavy duty vehicles aforedescribed, which will add to the vehicle operator's comfort thereby minimizing his fatigue, while at the same time providing a seat of extremely rigid and durable construction which will not fail under the extreme operating conditions to which it is subjected. In view of the fact that seats used with such heavy duty vehicles are subjected to such severe strains and stresses, it is desirable to provide a seat structure of economical design which will nevertheless be able to withstand such pronounced loadings.

It is, therefore, a principal object and feature of this invention to provide a seat assembly which is particularly adapted to absorb vertical and transverse loadings of an extereme nature as are found to exist in vehicles of the heavy duty type which are subjected to severe shock loadings.

It is yet another object and feature of this invention to provide a vertically adjustable seat assembly comprising a seat support relatively telescopically mounted about a base member, and spring and shock absorbing means operatively connected adjustably between the base member and the seat structure to resiliently and yieldingly support the latter.

It is another object and feature of this invention to provide a seat assembly of the type aforedescribed comprising relatively telescopically mounted hollow columns or cylinders which are adjustably interconnected for relative vertical movement by resiliently yieldable vertical load bearing means to support the weight of the vehicle operator disposed upon one of the columns, and bearing means interposed between adjacent telescopically related surfaces of the columns to resist and absorb lateral loads.

It is yet another object of this invention to provide the aforementioned vertically adjustable seat with an operating mechanism for effecting vertical adjustment thereof which comprises a mechanical drive means which may be manually actuated from the exterior of the seat structure, and which will translate rotary driving motion into a vertical reciprocating motion of the seat structure.

In general, these and other objects are attained by providing a seat assembly comprising a fixed base member including an upstanding column or pillar, a seat support including a similar column or pillar telescopically mounted with respect to the base member, lateral load bearing means interposed between adjacent telescoping surfaces of the respective pillars or columns, a height-controlling member connected through suitable manually accessible drive means for vertical adjustment within the pillars, and a coiled spring and double acting shock absorber operatively connected between this member and the seat structure itself whereby the latter is resiliently, yieldably and adjustably supported.

These and other features, objects and advantages of this invention will appear more fully hereinafter as the description proceeds, and in which reference is made to the following drawings in which.

Figure 1:
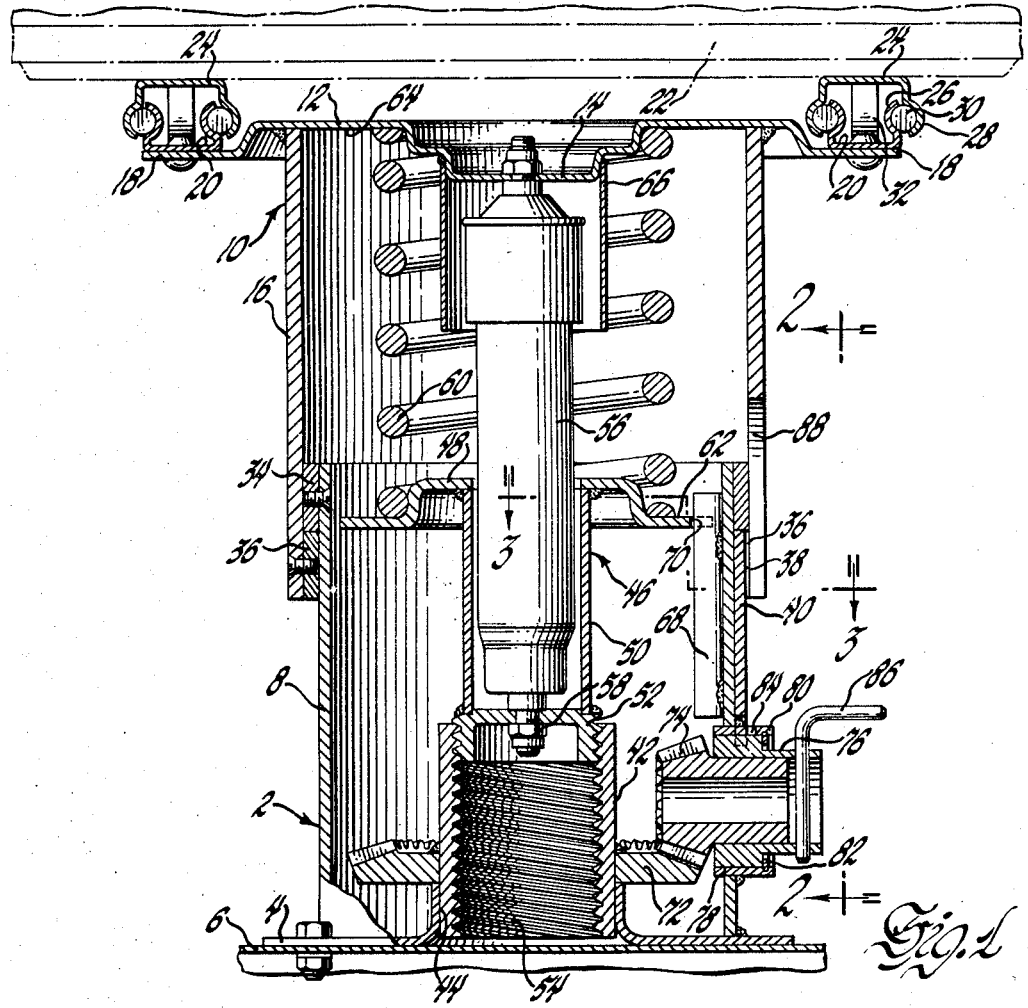
Figure 1 is a front elevational view, in cross section, of the seat of this invention.

Referring now to the drawings, the numeral 2 indicates generally a seat base comprising a base plate 4 adapted to be rigidly secured, as by bolting, to the floor 6 of a vehicle or other structure. The base member 2 further includes an upstanding hollow substantially cylindrical pillar or column 8 which is suitably welded to the base plate 4.

An adjustable support, indicated generally at 10, includes a support plate 12 having a central downwardly dished portion 14. Another hollow cylindrical column or pillar 16 is suitably welded to the support plate 12 substantially coaxially with the dished portion 14 thereof, and extends downwardly so as to telescope about the upper portion of the base member pillar 8. The support plate 12 may be of any suitable geometric configuration, but preferably is substantially rectangular and includes a pair of forwardly and rearwardly extending laterally spaced parallel flanges 18 on which the brackets or tracks 20 are suitably secured. The frame construction of the seat, indicated in phantom at 22, has secured thereto similar brackets or tracks 24. Associated brackets 20 and 24 have oppositely disposed flange portions thereof 26 and 28, respectively, which are arcuately curved so as to form a substantially circular guide for the reception of longitudinally extending guide rods 30, while any desired number of roller bearing elements 32 may be disposed between the bracket members 20 and 24. Thus, it will be seen, the seat frame structure is capable of fore and aft longitudinal adjustment upon the seat support plate 12. In this regard, it should be noted that the particular form of mechanism shown for accomplishing fore and aft adjustment of the seat is purely for illustrative purposes, inasmuch as other types of means are well known to accomplish this purpose. Moreover, although not shown, such a fore and aft adjustment mechanism will usually employ latches or other devices to effect positive holding of the seat in any adjusted position.

In order to correctly orient the upper pillar member 16 with respect to the lower pillar 8, an annular bearing member or ring 34 is suitably fixedly secured to the outer wall of the lower pillar 8 and is in abutting sliding engagement with the inner wall of the upper pillar 16. A similar bearing member 36, which is of split ring construction, is similarly secured to the interior wall of the upper pillar 16 below the bearing member 34 and is in abutting sliding engagement with the exterior side wall of the lower pillar 8. As is indicated principally in Figure 2, the ends 38 of the split ring bearing 36 are spaced from each other so as to closely embrace or straddle a guide plate 40 rigidly secured to the exterior face of the lower cylindrical pillar 8. It will therefore be seen that the guide plate 40 and the ends 38 of the split-ring bearing 36 cooperate to restrain the respective pillars from relative rotation thereby maintaining the seat frame structure 22 in an oriented position.

The means for adjustably resiliently maintaining a predetermined level of the seat frame 22 comprises an internally threaded collar 42 suitably journalled in a cylindrical aperture formed in the center of the base plate 4 by means of an upturned cylindrical flange 44 formed therein. A vertically adjustable height-controlling assembly 46 includes a spring seat 48 of substantially inverted dished shape suitably welded to a hollow cylindrical tube 50 having its lower end welded or otherwise secured to an externally threaded nut 52 which is in threadable engagement with the threads 54 of the collar 42. A double acting shock absorber 56 has its lowermost end bolted at 58 to the center of the nut 52, while its uppermost end is secured to the center of the dished seat support 12. A relatively heavy coiled spring 60 is coaxially mounted about the shock absorber 56 and has its lowermost end seated on an annular radially extending flange 62 of the spring seat 48, while its upper end engages a suitable seat 64 formed at the periphery of the dished portion of the seat support plate 12.

A rigid metal sleeve or shroud 66 is coaxially mounted about the upper end of the shock absorber 56 and rigidly secured to the seat support plate 12. The lowermost end of this shroud is normally spaced, as shown in Figure 1, vertically above the spring seat 48, but will act as a stop in abutting this plate upon overload travel of the seat support plate relative to the base member 2. An upstanding reaction bar or plate 68 is rigidly secured to the interior wall of the lower pillar 8, and extends laterally inwardly to engage a suitably contoured notch 70 in the periphery of the annular plate or spring seat 48. It will be readily apparent that cooperation between the reaction bar 68 and the notch in which it rides precludes the height-controlling assembly 46 from rotating.

In order to impart rotation to the threaded collar 42, there is secured thereto a horizontally disposed bevel gear 72 having its lowermost face piloted upon the upwardly presented edge of the cylindrical flange 44. A bevel pinion 74 is press fitted or otherwise firmly secured in the bore of an adapter member 76 having a cylindrical shouldered portion 78 suitably rotatably piloted in the cylindrical sleeve or bushing 80 welded in an aperture in the side wall of the lower pillar 8 beneath the guide plate 40. The bevel pinion 74 and its adapter are maintained in the position shown, that is with the pinion in mesh with the gear 72, by any suitable means such as a snap-ring 82. A port or ports 84 may be provided in the bushing 80 for lubrication purposes. The manually actuable operating handle 86 extends through the adapter 76 for rotation of the bevel pinion to effect seat adjustment.

Figure 2:
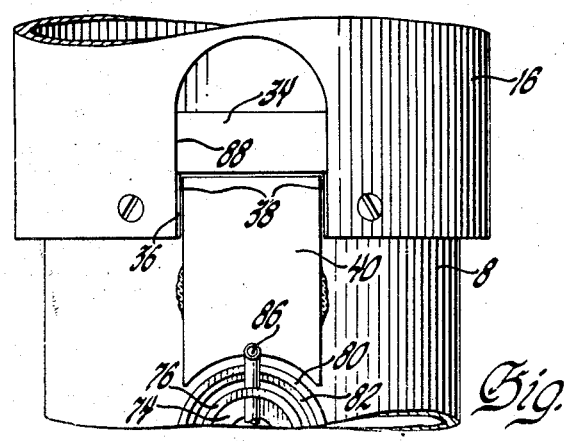
Figure 2 is a fragmentary side elevational view taken on line 2—2 of Figure 1.
Figure 3:
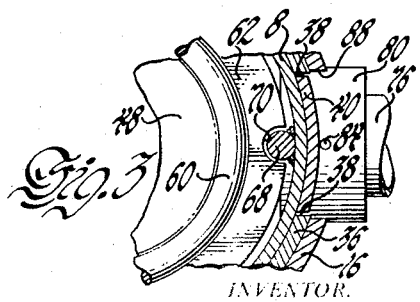
Figure 3 is a fragmentary sectional view taken on line 3—3 of Figure 1.

From Figure 2 it will be noted that a portion of the upper pillar 16 has been cut out as indicated at 88 so as to provide the necessary clearance between the upper pillar and the assembly associated with the bevel pinion 74 as the upper pillar member moves downwardly in compression.

In operation, and with the seat support assembly disposed in a given vertical position of adjustment relative to the base 2, the coiled spring 60 resiliently resists downward movement of the seat support plate 12 while the double acting shock absorber compensates for over-riding in the assembly and more or less dampens oscillations therein in much the same manner as a conventional shock absorber employed in vehicle suspensions. If the vehicle operator desires to adjust the initial level of the seat either up or down, he merely rotates the bevel pinion 74 in the suitable direction which, through the bevel gear 72, rotates the threaded collar 42. As this collar rotates, vertical movement is given to the assembly 46 inasmuch as the latter cannot rotate because of the cooperative engagement between the guide bar or plate 68 and the spring support plate 48.

According to the preferred embodiment of the invention as shown in the drawings, the main supporting pillars 8 and 16 as well as the components of the height controlling assembly 46, collar 42 and gear 72 are disposed substantially co-axially. The pillars 8 and 16 in cooperation with the bearing members 34 and 36 provide means for resisting lateral loads, while the centrally upstanding operating mechanism 46 disposed within the pillars yieldably resists vertical loading. While such an arrangement is preferred because of its obvious simplicity, ease of maintenance, extreme durability and facility of manufacture, it will be readily apparent that changes in the specific construction shown will be apparent to those skilled in the art. For example, a number of shock absorber and spring constructions may be utilized as desired preferably with a single gear means to effect conjoint vertical movement thereof. Furthermore, although the pillar members 8 and 16 have been shown to be cylindrical in construction, which is preferable because of the inherent rigidity in such a geometric formation, it will be further apparent that other configurations may be employed. For example, the respective pillars may be rectangular in cross-section or, for that matter, of any other polygonal cross-section. In this conjunction, one advantage to be gained from a polygonal cross-section is that the guide or restraining plate 40 and its association with the split bearing ring 36 may be eliminated inasmuch as the corners of the respective pillars will restrain them from relative rotation.

Therefore, having shown and described a preferred embodiment of the invention, it is to be understood that the invention is not to be limited thereby but only by the scope of the claims which follow.

What is claimed is:

1. A vertically adjustable seat assembly comprising an upstanding base, an upstanding vertically adjustable seat support telescopically mounted on said base, mechanism for yieldably supporting and adjusting said seat support on said base, said mechanism comprising vertically adjustable height-controlling means, spring means extending between said height-controlling means and said seat support, and means for controlling vertical movement of said height-controlling means, said last named means including a threaded rotatable driving member, driven means on said height-controlling means threadably engaging said driving member, and cooperating reaction means on said base and height-controlling means for restraining the latter from rotation as said driving member is rotated.

2. A vertically adjustable seat assembly comprising an upstanding base, an upstanding vertically adjustable seat support telescopically mounted on said base, means formed on adjacent portions of said base and seat support to restrain relative rotary movement therebetween, mechanism for yieldably supporting and adjusting said seat support on said base, said mechanism comprising vertically adjustable height-controlling means including a spring support, spring means extending between said spring support and said seat support, and means for controlling vertical movement of said height-controlling means, said last named means including a threaded rotatable driving member, driven means on said height-controlling means threadably engaging said driving member, and cooperating reaction means on said base and height-controlling means for restraining the latter from rotation as said driving member is rotated.

3. A vertically adjustable seat assembly comprising an upstanding base, an upstanding vertically adjustable seat support telescopically mounted on said base, means formed on adjacent portions of said base and seat support to restrain relative rotary movement therebetween, mechanism for yieldably supporting and adjusting said seat support on said base, said mechanism comprising vertically adjustable height-controlling means including a spring support, a shock absorber operatively connected to said height-controlling means and to said seat support, spring means extending between said spring support and said seat support, and means for controlling vertical movement of said height-controlling means, said last named means including a threaded rotatable driving member, driven means on said height-controlling means threadably engaging said driving member, and cooperating reaction means on said base and height-controlling means for restraining the latter from rotation as said driving member is rotated.

4. A vertically adjustable seat assembly comprising an upstanding base, an upstanding vertically adjustable seat support telescopically mounted on said base, cooperating guide means formed on adjacent portions of said base and seat support to restrain relative rotary movement therebetween, mechanism for yieldably supporting and adjusting said seat support upon said base, said mechanism comprising vertically adjustable spring support means, a double acting shock absorber operatively connected to said spring support means and to said seat support, a coiled spring extending between said spring support means and said seat support, and externally operable means for controlling vertical movement of said spring support means, said last named means including a threaded rotatable driving member, driven means on said height-controlling means threadably engaging said driving member, and cooperating reaction means on said base and height-controlling means for restraining the latter from rotation as said driving member is rotated.

5. A vertically adjustable seat assembly comprising an upstanding base, an upstanding vertically adjustable seat support telescopically mounted on said base, means formed on said base and seat support to restrain relative rotary movement therebetween, mechanism for yieldably supporting and adjusting said seat support on said base, said mechanism comprising height-controlling means, resilient load bearing means mounted on said height-controlling means and yieldably supporting said seat support, externally actuable drive means for vertically positioning said height-controlling means, said last named means including an upstanding rotatable collar having threads formed thereon about its vertical axis, threaded means on said height-controlling means engaging said threaded collar, and cooperating reaction means on said height-controlling means and base for restraining said height-controlling means from rotation as said collar is rotated.

6. A vertically adjustable seat assembly comprising an upstanding base, an upstanding vertically adjustable seat support telescopically mounted on said base, cooperating guide means formed on said base and seat support to restrain relative rotary movement therebetween, mechanism for adjustably yieldably supporting said seat support on said base, said mechanism comprising a vertically adjustable load bearing member, resilient means mounted on said member and yieldably supporting said seat support in a given vertical position, externally actuable drive means for vertically positioning said member, said last named means including an upstanding rotatable collar having threads formed thereon about its vertical axis, threaded means on said member engaging said threaded collar, and cooperating reaction means on said member and base for restraining said member from rotation as said collar is rotated.

7. A vertically adjustable seat assembly comprising an upstanding base, an upstanding vertically adjustable seat support telescopically mounted on said base, cooperating guide means formed on said base and seat support to restrain relative rotary movement therebetween, mechanism for adjustably yieldably supporting said seat support on said base, said mechanism comprising a vertically adjustable member including a spring platform, a shock absorber operatively secured respectively to said member and said seat support, a coiled spring extending between and engaging said platform and said seat support, externally actuable drive means for vertically positioning said member, said last named means including an upstanding rotatable collar having threads formed thereon about its vertical axis, threaded means on said member engaging said threaded collar, and cooperating reaction means on said member and base for restraining said member from rotation as said collar is rotated.

8. A vertically adjustable seat assembly comprising an upstanding base, an upstanding vertically adjustable seat support telescopically mounted on said base, bearing means interposed between and carried respectively by adjacent telescoping surfaces of said base and support, one of said means including a split ring secured to said support below the other of said bearing means on said base and having its ends spaced from each other, an upstanding guide secured to said base and extending between the ends of said split ring to limit relative rotary movement between said seat support and base, means for vertically adjusting said seat support relative to said base, said adjusting means comprising a vertically adjustable load bearing member, means for vertically adjusting said member, and yieldable means mounted on said member and supporting said seat support in a given vertical position.

9. A vertically adjustable seat assembly comprising a fixed base, a vertically adjustable seat support telescopically mounted on said base, drive means for vertically adjusting said support, said means comprising driving means rotatably mounted in said base, driven means rotatably mounted on a vertical axis within said base, said driven means including a threaded portion, a vertically adjustable nut threadably engaging said threaded portion, a platform secured above and to said nut for adjustment therewith, a reaction member on said base engageable with said platform to restrain rotation of the latter, a vertically extending shock absorber rigidly secured between said nut and said seat support, a spring coiled about said shock absorber and having its ends abutting said platform and support, and stop means carried by said seat support and normally spaced above said platform and engageable therewith upon overload travel of said seat support relative to said base.

10. A vertically adjustable seat assembly comprising an upstanding base, an upstanding vertically adjustable seat support telescopically mounted about said base, bearing means interposed between adjacent telescoping surfaces of said base and support, one of said means including a split ring secured to said support and having its ends spaced from each other, an upstanding guide secured to said base and extending between the ends of said split ring to limit relative rotary movement between said support and base, mechanism for vertically adjusting said support relative to said base, said mechanism comprising externally actuable rotary drive means supported by said base, rotary driven means supported by said base and operatively connected to said drive means, said driven means including an upstanding threaded collar, a seat support assembly threadably connected to said collar, reaction means carried by said base and engaging said seat support assembly to restrain the latter from rotation with said driven means as the latter is rotated whereby said seat support assembly will be translated in a vertical path, yieldable means mounted on said seat support assembly and yieldably maintaining said seat support in a given vertical position, and stop means carried by said seat support to limit downward overload travel of the latter.

11. A vertically adjustable seat assembly comprising an upstanding base, an upstanding vertically adjustable seat support telescopically mounted on said base, bearing means interposed between adjacent telescoping surfaces of said base and support, one of said means including a split ring secured to said support and having its ends spaced from each other, an upstanding guide secured to said base and extending between the ends of said split ring to limit relative rotary movement between said seat support and base, means for vertically adjusting said seat support relative to said base, said adjusting means comprising a vertically adjustable load bearing member, means for vertically adjusting said member, yieldable means mounted on said member and supporting said seat support in a given vertical position, and stop means secured to said seat support and normally spaced above said member and engageable therewith upon overload travel of said seat support relative to said base.

12. A vertically adjustable seat assembly comprising an upstanding base, an upstanding vertically adjustable seat support telescopically mounted on said base, bearing means interposed between and carried respectively by adjacent telescoping surfaces of said base and support, one of said means including a split ring secured to said support below the other of said bearing means on said base and having its ends spaced from each other, an upstanding guide secured to said base and extending between the ends of said split ring to limit relative rotary movement between said seat support and base, means for vertically adjusting said seat support relative to said base, said adjusting means comprising a vertically adjustable load bearing member, exteriorly actuable means for vertically adjusting said member, a coiled spring extending between said member and said seat support, and a shock absorber operatively connected between said member and said seat support within said spring.

13. A vertically adjustable seat assembly comprising an upstanding base, an upstanding vertically adjustable seat support telescopically mounted on said base, bearing means interposed between adjacent telescoping surfaces of said base and support, one of said means including a split ring secured to said support and having its ends spaced from each other, an upstanding guide secured to said base and extending between the ends of said split ring to limit relative rotary movement between said seat support and base, means for vertically adjusting said seat support relative to said base, said adjusting means comprising a vertically adjustable load bearing member, exteriorly accessible and actuable means for vertically adjusting said member, a coiled spring extending between said member and said seat support, a shock absorber operatively connected between said member and said seat support within said spring, and a downwardly extending shroud secured to said seat support and surrounding the upper end of said shock absorber within said coiled spring, said shroud having its lower end normally spaced above said member and engageable therewith upon overload travel of said seat support relative to said base.

14. A vertically adjustable seat assembly comprising an upstanding base, an upstanding vertically adjustable seat support telescopically mounted on said base, bearing means interposed between adjacent telescoping surfaces of said base and support, one of said bearing means including a split ring having its ends spaced from each other, an upstanding guide extending between the ends of said split ring, said split ring and guide being operatively secured to telescoping portions of said base and seat support, means for vertically adjusting said seat support relative to said base, said adjusting means comprising externally operable gear means mounted within said base, a threaded collar drivingly connected to said gear means for rotation about a vertical axis, a threaded nut engaging the threads of said collar for vertical travel as the latter is rotated, an upstanding load bearing member including a hollow pillar secured to said nut and a laterally extending platform at the opposite end thereof, an upstanding reaction guide secured to said base and engageable by said platform to prevent rotation of the latter and said nut as said collar is rotated, a coil spring extending between and engaging said platform and seat support, a shock absorber connected to said nut and extending through said pillar and spring for connection to said seat support, and a downwardly extending shroud secured to said seat support within said coiled spring and surrounding the upper end of said shock absorber, said shroud having its lower end normally spaced above said platform and engageable therewith upon overload travel of said seat support relative to said base.

15. A vertically adjustable seat assembly comprising a seat support, a base member, said seat support and base member each having vertically oppositely extending hollow pillars secured thereto telescopically mounted for relative vertical adjustment, bearing means interposed between adjacent telescoping surfaces of said pillars, one of said bearing means comprising a bearing ring fixedly secured to said base member pillar and in relative sliding engagement with said seat support pillar, another of said bearing means including a split ring bearing member rigidly secured to said seat support pillar beneath said one bearing means and in sliding engagement with said base member pillar, an upstanding guide bar secured to said base member pillar between the latter and said seat support pillar, the terminal ends of said split ring bearing member straddling said guide member, mechanism for adjustably resiliently supporting said seat support vertically above said base member, said mechanism comprising a vertically adjustable height-controlling mechanism mounted within said pillars, a threaded nut secured to said last named mechanism, a rotary threaded collar rotatably journalled in said base member for rotation about a vertical axis and operatively engaging said nut, externally accessible manually actuable gear means operatively secured to said collar to rotate the latter, a reaction member secured to said base member pillar and engaging said height-controlling mechanism to restrain the latter from rotation as said collar is rotated, a double acting shock absorber secured to said nut and said seat support, a coiled spring surrounding said shock absorber and extending between said height-controlling mechanism and said seat support, and a shroud secured to said seat support co-axially with said spring and extending downwardly about the upper portion of said shock absorber, the lower edge of said shroud being normally vertically spaced above said height-controlling but abuttable therewith upon overload travel of said seat support relative to said base member.

16. A vertically adjustable seat assembly comprising an upstanding base, an upstanding vertically adjustable seat support telescopically mounted on said base, cooperating means formed on said base and seat support to restrain relative rotary movement therebetween, mechanism for yieldably supporting and adjusting said seat support on said base, said mechanism comprising height-controlling means, resilient load bearing means mounted on said height-controlling means and yieldably supporting said seat support, externally actuable drive means for vertically positioning said height-controlling means, said last named means including a threaded rotatable driving member, driven means on said height-controlling means threadably engaging said driving member, and cooperating reaction means on said base and height-controlling means for restraining the latter from rotation as said driving member is rotated.

17. A vertically adjustable seat assembly comprising an upstanding base, an upstanding vertically adjustable seat support telescopically mounted on said base, bearing means secured to said base and interposed between the latter and the adjacent surface of said support, additional bearing means secured to said support and interposed between the latter and the adjacent surface of said base, said last named bearing means being located below and movable against said first named bearing means to limit upward travel of said support, guide means secured to said base and cooperating with said bearing means secured to said support to prevent rotary movement of the latter, means for vertically adjusting said seat support relative to said base, said adjusting means comprising a vertically adjustable load bearing member, means for vertically adjusting said member, and yieldable spring means mounted on said member and engaging said seat support to continuously urge the latter upwardly.

(References on following page)

References Cited in the file of this patent

UNITED STATES PATENTS

| | | |
|---|---|---|
| 882,656 | Tingdahl | Mar. 24, 1908 |
| 889,637 | Rowell | June 2, 1908 |
| 1,023,620 | Burge | Apr. 16, 1912 |
| 1,332,200 | Borgarello | Mar. 2, 1920 |
| 2,092,669 | Greve | Sept. 7, 1937 |
| 2,229,769 | Raders | Jan. 28, 1941 |
| 2,484,722 | Nickelsen et al. | Oct. 11, 1949 |

FOREIGN PATENTS

| | | |
|---|---|---|
| 3,209 | Great Britain | 1912 |